(12) United States Patent
Overson et al.

(10) Patent No.: US 11,441,721 B1
(45) Date of Patent: Sep. 13, 2022

(54) WEATHER RESISTANT PIPELINE VIBRATION DAMPENER CONNECTOR SYSTEM UTILIZING ARCTIC GRADE RUBBER

(71) Applicants: Jared Lloyd Overson, Anchorage, AK (US); Nathan Ridley, Anchorage, AK (US)

(72) Inventors: Jared Lloyd Overson, Anchorage, AK (US); Nathan Ridley, Anchorage, AK (US)

(*) Notice: Subject to any disclaimer, the term of this patent is extended or adjusted under 35 U.S.C. 154(b) by 157 days.

(21) Appl. No.: 16/991,274

(22) Filed: Aug. 12, 2020

Related U.S. Application Data

(60) Provisional application No. 62/906,227, filed on Sep. 26, 2019.

(51) Int. Cl.
*F16F 3/02* (2006.01)
*F16L 55/04* (2006.01)
*F16F 7/116* (2006.01)

(52) U.S. Cl.
CPC ............. *F16L 55/041* (2013.01); *F16F 3/02* (2013.01); *F16F 7/116* (2013.01); *F16F 2222/08* (2013.01); *F16F 2224/025* (2013.01); *F16F 2224/0208* (2013.01); *F16F 2226/04* (2013.01); *F16F 2226/048* (2013.01); *F16F 2228/002* (2013.01); *F16F 2228/007* (2013.01)

(58) Field of Classification Search
CPC ................. F16F 3/02; F16F 2224/0208; F16F 2224/025; F16F 2226/04; F16F 2226/048; F16F 2228/002; F16F 2228/007; F16F 7/116; F16F 1/50; F16F 1/505; F16F 15/10; F16L 55/041

USPC .......................................................... 267/154
See application file for complete search history.

(56) References Cited

U.S. PATENT DOCUMENTS

| | | | | | |
|---|---|---|---|---|---|
| 2,736,720 | A | * | 2/1956 | Kidwell | C08L 9/00 524/588 |
| 2,950,609 | A | * | 8/1960 | Goodloe | F16C 1/02 464/58 |
| RE32,878 | E | * | 2/1989 | Leonard | E05F 1/1033 267/273 |
| 4,976,417 | A | * | 12/1990 | Smith | B60G 11/188 267/155 |
| 4,984,776 | A | * | 1/1991 | Smith | F16F 1/16 24/114.5 |
| 5,000,430 | A | * | 3/1991 | Smith | F16F 1/16 267/273 |
| 5,009,405 | A | * | 4/1991 | Smith | B60G 11/188 267/281 |
| 5,120,032 | A | * | 6/1992 | Smith | F16F 1/14 267/284 |

(Continued)

*Primary Examiner* — Xuan Lan Nguyen
(74) *Attorney, Agent, or Firm* — Michael J. Tavella

(57) ABSTRACT

A damper that is made up of a number of dampening members that have a flexible core that is covered with an arctic grade rubber cover. Each dampening member is then attached to links that make up the damper chain. The steel core is made of steel wire that is fitted with a bolt at each end. The cover is placed over the steel core and is then sealed with end covers that are glued in place. Each end cover has a hole to receive a fastener that first passes through a link and then into the bolt at the end of the steel core. In this way, a strong, yet flexible damper chain is formed that is able to stand up to the harshest weather conditions for a long life.

17 Claims, 9 Drawing Sheets

(56) References Cited

U.S. PATENT DOCUMENTS

| | | | | |
|---|---|---|---|---|
| 5,193,644 A | | 3/1993 | Hart et al. | |
| 5,690,322 A | * | 11/1997 | Hay | F16F 7/14 |
| | | | | 267/273 |
| 5,950,970 A | * | 9/1999 | Methany | F16F 7/14 |
| | | | | 248/65 |
| 6,397,988 B1 | * | 6/2002 | Ptak | F16F 1/505 |
| | | | | 188/380 |

\* cited by examiner

WEATHER RESISTANT PIPELINE VIBRATION DAMPENER CONNECTOR SYSTEM UTILIZING ARCTIC GRADE RUBBER

CROSS REFERENCE TO RELATED APPLICATIONS

This application claims benefit of Provisional application 62/906,227 filed Sep. 26 2019.

STATEMENT REGARDING FEDERALLY SPONSORED RESEARCH AND DEVELOPMENT

Not Applicable

BACKGROUND OF THE INVENTION

1. Field of the Invention

This invention relates to pipeline vibration dampeners and particularly to weather resistant pipeline vibration dampeners utilizing arctic grade rubber.

2. Description of the Prior Art

Current pipeline vibration dampener (PVD) connector systems fail prematurely due to weather, and strain. Current systems are not made to withstand extended strain of the workload and cold weather environments.

One such system is described in U.S. Pat. No. 5,193,644 to Hart et al. (Hart) It teaches a PVD that is made up of links that, together, act as a spring. The Hart system uses elastomer material that is designed to flex. The members are connected together with links that also attach to the pipeline and a lower structure that is a weighted mass. Hart teaches that each link has two washers inside the elastomer material that act as plates to attach fasteners to the links. That allows the links to remain flexible. The problem with this system is that the elastomer material simply does not hold up to repeated flexing. Moreover, in arctic conditions, the material weathers poorly, fails and had to be replaced. This causes labor and money to be spent to make the needed repairs.

BRIEF DESCRIPTION OF THE INVENTION

The instant invention overcomes the difficulties described above. It is a dampening member that has a flexible core that is covered with an arctic grade rubber cover. Each dampening member is then attached to links that make up the damper chain. The solid core is made of steel wire that is fitted with a bolt at each end. The cover is placed over the steel core and is then sealed with end covers that are glued in place. Each end cover has a hole to receive a fastener that passes through a link and then into the nut at the end of the steel core. In this way, a strong, yet flexible dampening member is formed that is able to stand up to the harshest weather conditions for a long life.

DETAILED DESCRIPTION OF THE INVENTION

Figure 1:
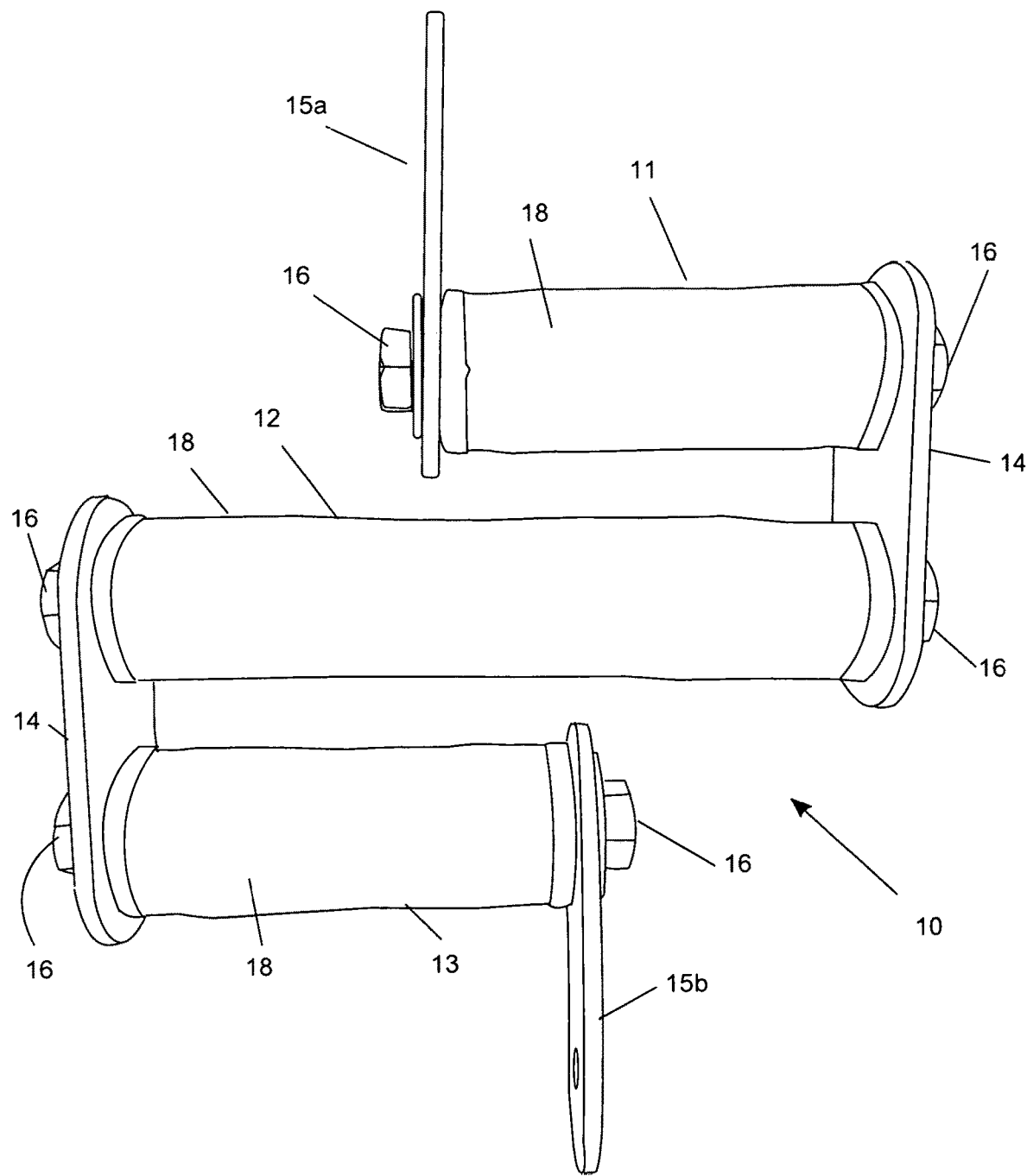
FIG. 1 is a side view of the assembled system shown with three members secured to links.
Figure 1A:
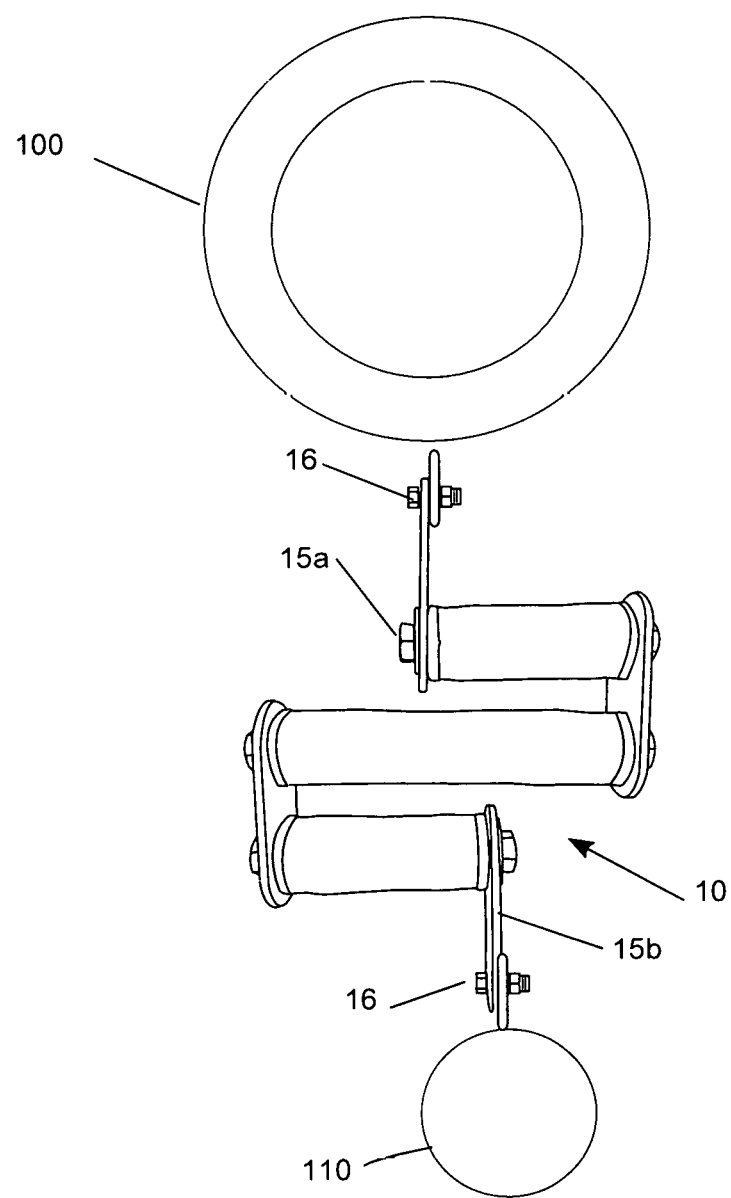
FIG. 1a is a side view of the assembled system in place on a pipeline.
Figure 2:
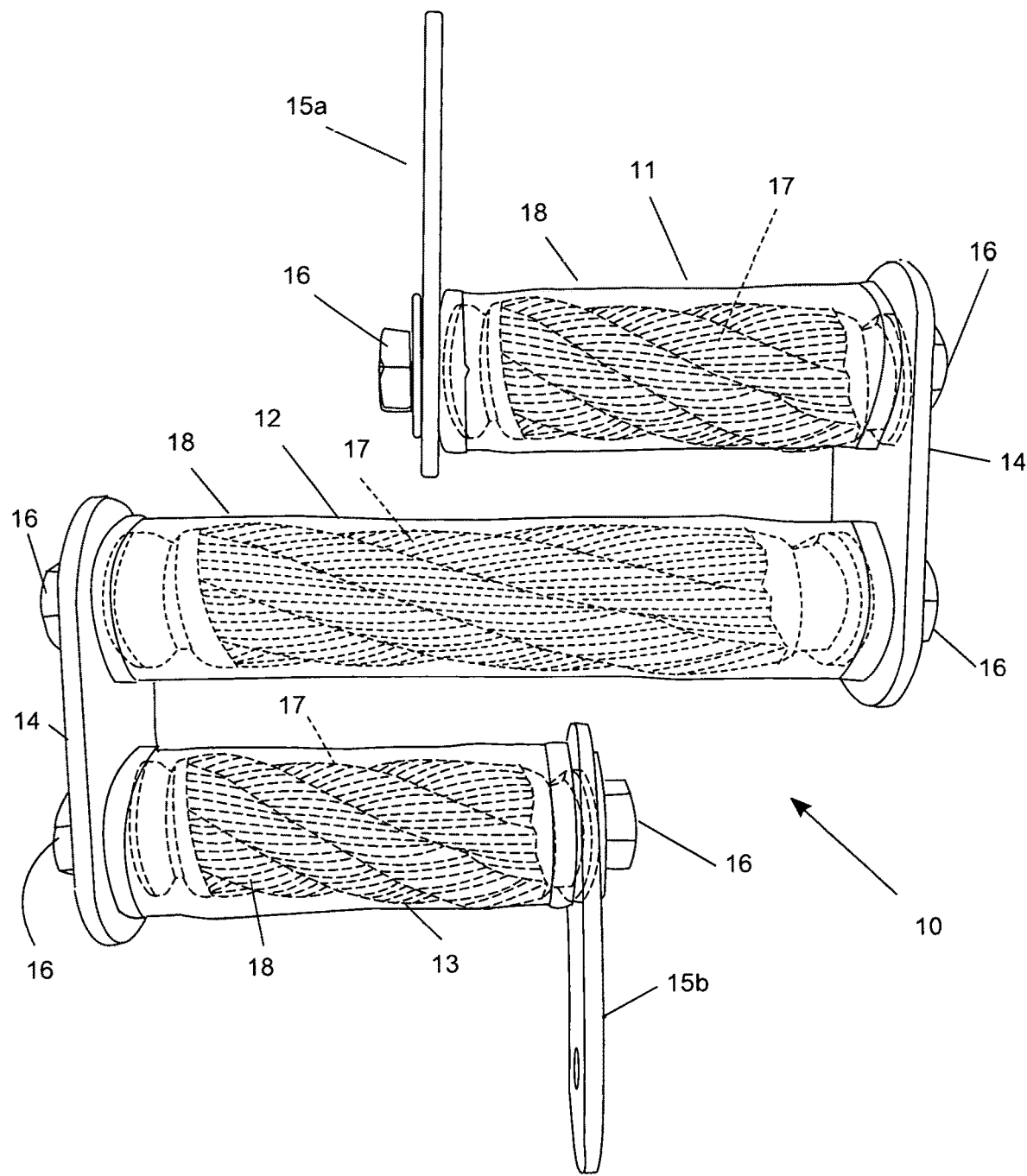
FIG. 2 is a side view of the system shown with three members secured to links showing the internal core members in dashed lines.

Referring now to the drawing figures and especially FIGS. 1, 1a and 2, FIG. 1 is a side view of the assembled system shown with three dampening members 11, 12 and 13 secured to links. FIG. 1a is a side view of the assembled system in place on a pipeline. FIG. 2 is a side view of the system shown with three members secured to links showing the internal core members in dashed lines. This damper system is used to minimize vibrations in pipelines. The invention 10 consists of a number of dampening members 11, 12 and 13. That are connected by links 14. The ends of the link chain are an upper terminal link 15a that attaches to a pipeline 100, and a lower terminal link 15b that attaches to a weight 110 (see FIG. 1a). In use, the damper 10 is suspended from the bottom of the pipeline 100 by a terminal link 15a and fasteners 16 (typically, a bolt and nut) or similar fasteners, as discussed below. The lower terminal link 15b is connected to a support member 110 for a damper "mass" or weight member, which is preferably of a suitable shape to minimize the effects of wind forces. Considering the various directions from which the wind may act on the weight member, the preferred shape of the member 110 is spherical. Note that the pipeline 100 and weight 110 are not part of the instant invention. They are only shown as an example of use.

Each of the dampening members 11, 12 and 13 are made up of two components. As shown in FIG. 2, the dampening members comprise an inner core 17 and an outer covering tube 18. Note that FIG. 1 shows the outer covers 17 in place. Both the inner core 17 and the outer covering are discussed in detail below. Note too, that the links 14 are secured to the dampening members 11, 12 and 13 by bolts 19 that are secured in the ends of the inner cores 17 as discussed below. Note that the lengths of the dampening members 11, 12 and 13 are not the same. The lengths of the links can vary as shown. Similarly, the diameters of the dampening members 11, 12 and 13 can vary as well. Moreover, the number of links can vary as necessary depending on the amount of dampening is required.

Figure 3:
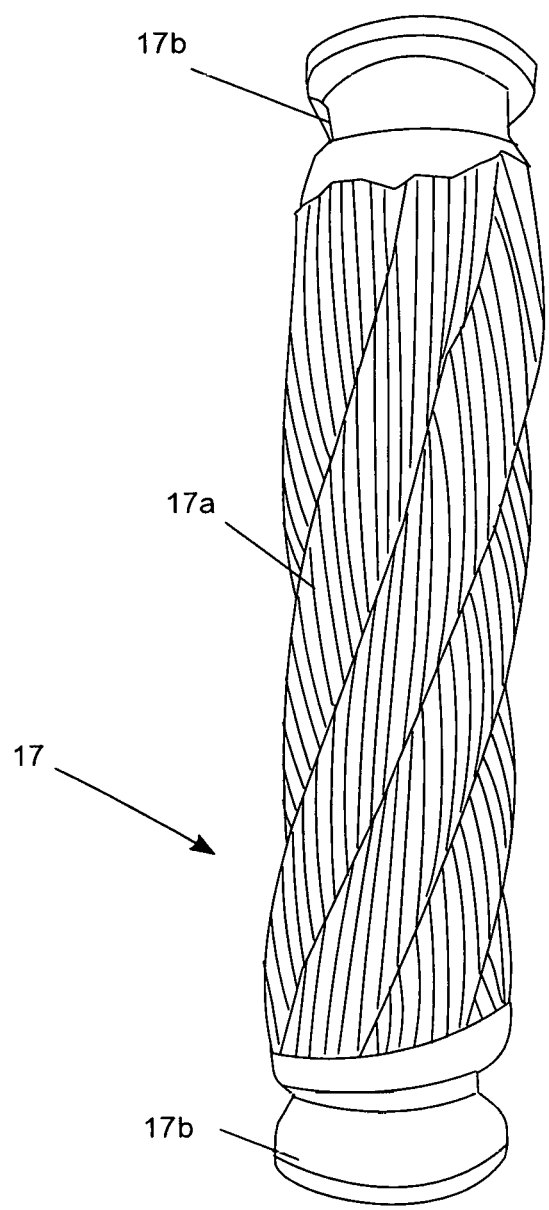
FIG. 3 is a front view of one of the steel cores.
Figure 4:
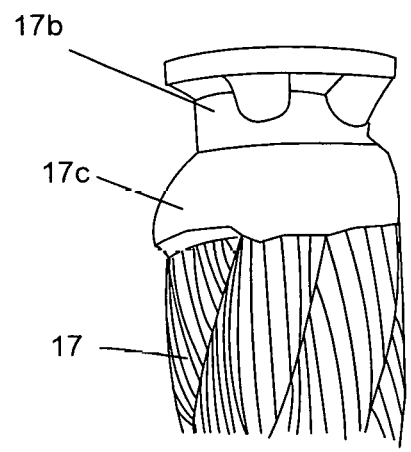
FIG. 4 is a detail view of the top of a steel core showing the attached nut.
Figure 5:
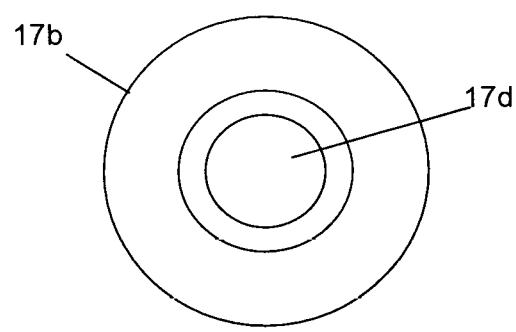
FIG. 5 is a top view of the steel core showing the opening for a fastener in the nut.

Referring now to FIGS. 3, 4 and 5, a front view of one of the steel inner cores 17 is shown in FIG. 3. In FIG. 3, the steel core 17 is shown. In the preferred embodiment, the steel core is made of 1" steel wire cable having a 6×25 independent wire rope core (IWRC) that has a minimum breaking strength of 83600 lbs. with a safe load 16,700 lbs. The core 17 consists of a stranded length of wire rope 17a that has a pair of threaded nuts 17b attached, one at each end, of the length of wire rope 17a, as shown. Note too, that the nuts 17b are welded onto the ends of the length of wire rope 17a. The nuts 17b can be considered as a means for accepting a threaded fastener. Of course any other similarly threaded fitting can be used as well.

In the preferred embodiment, the welding is done using ER70S welding wire, having 78,000 psi tensile strength and 65,500 psi yield strength. Once welded, the welds are ground and shaped to make the transition between the length of wire rope 17a and the nuts 17b as seamless as possible. FIG. 4 is a detail view of one end of a steel core 17 showing the attached nut 17b to the length of wire rope 17a. Note the transition region 17c, which is shown smoothed. FIG. 5 is a top view of the steel core showing the opening 17d for a fastener in the nut 17b. The opening 17d is threaded and is designed to hold a bolt 16 or other threaded fastener, installed in it, as discussed below.

Figure 6:
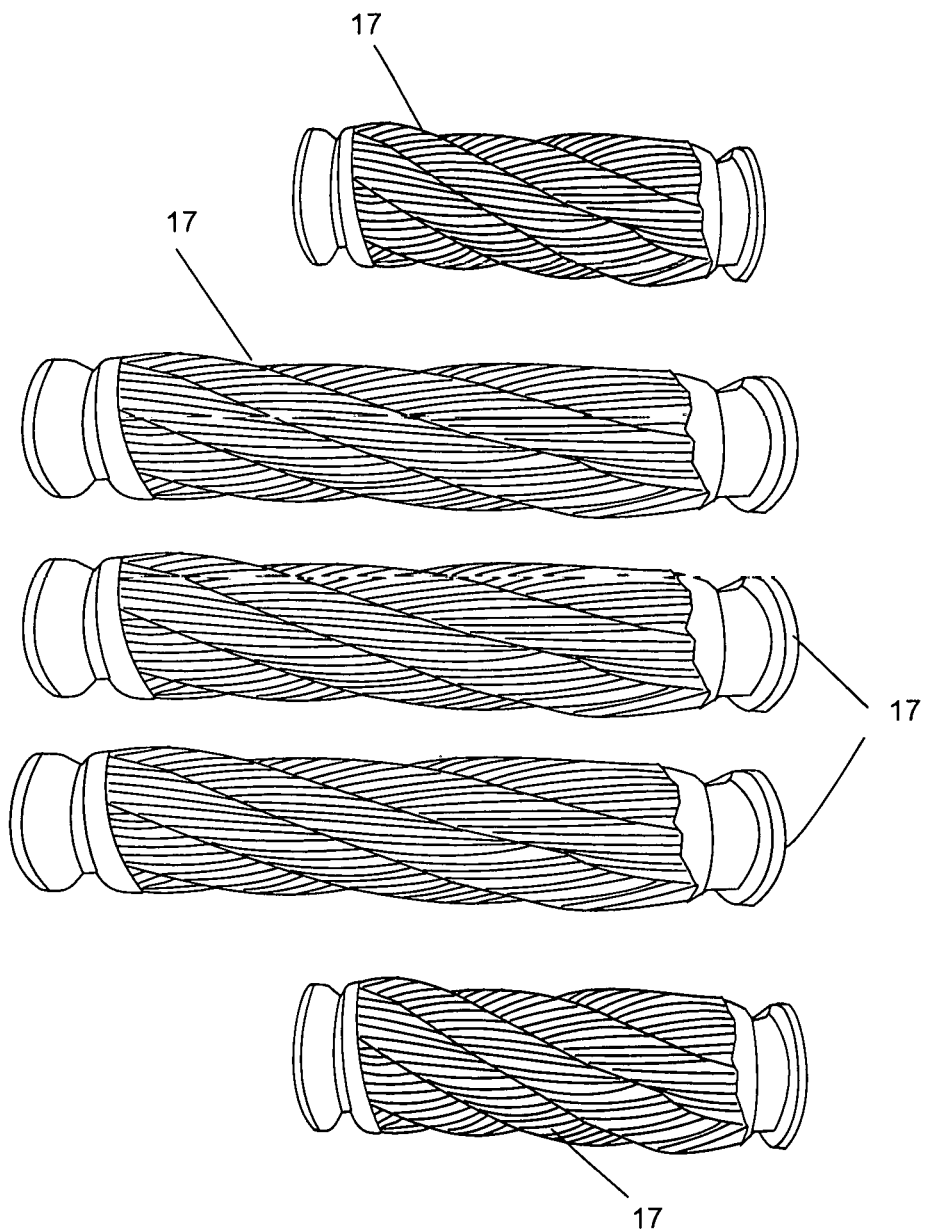
FIG. 6 is a side detail of steel cores showing two different lengths.

FIG. 6 is a side detail of steel cores 17 showing two different lengths. As discussed above, the use of different lengths of steel core allows for variations in the dampening ability of the overall damper. It also allows for easy alignment of the components.

Figure 7:
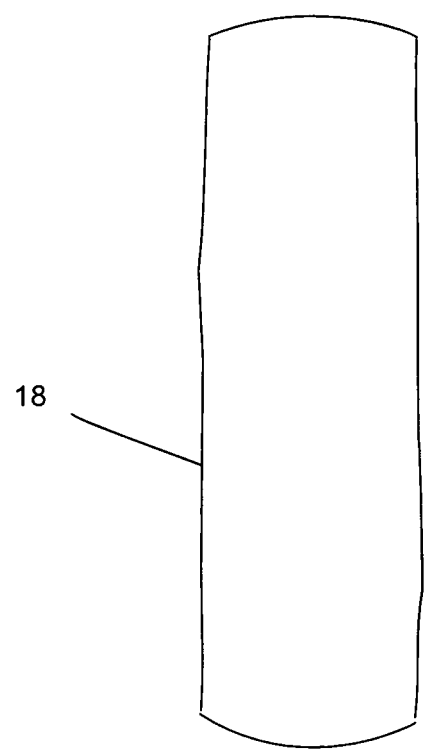
FIG. 7 is a side view of a length of an outer cover for the steel cores.

FIG. 7 is a side view of a length of an outer cover tube 18 for the steel cores 17. In the preferred embodiment, the outer cover tube 18 is made of class A multipurpose tubing, arctic grade rubber, rated at −65 to +180 degrees.

Figure 8:
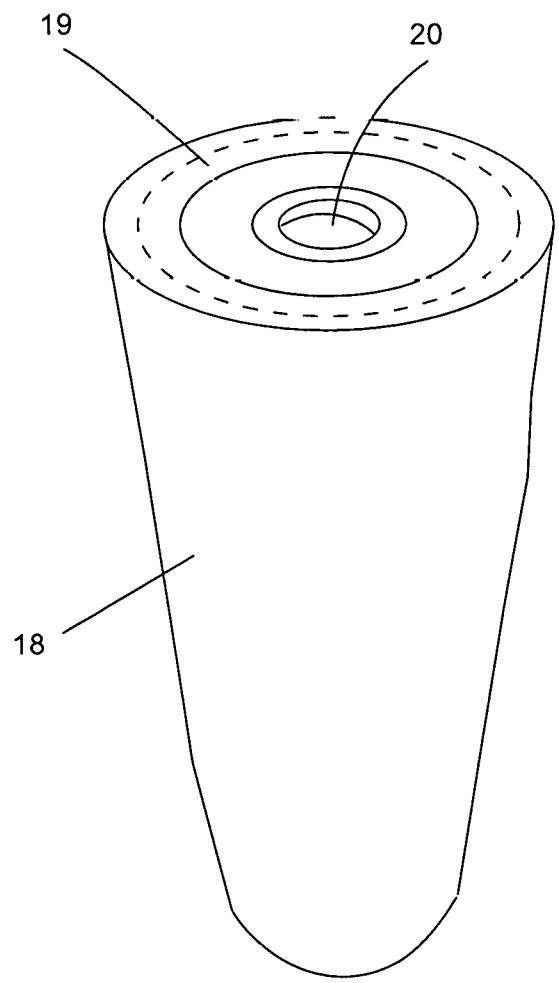
FIG. 8 is a top perspective view of the outer cover showing an end cover in place.
Figure 9:
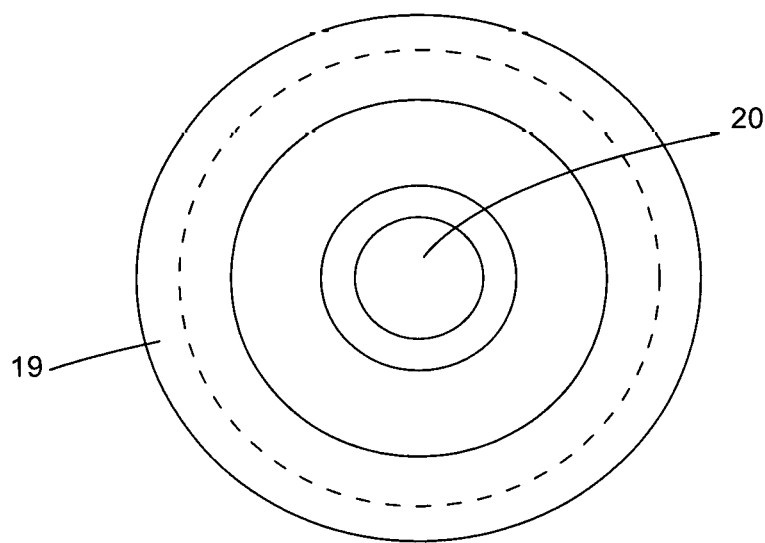
FIG. 9 is a top view of an end cover.

FIG. 8 is a top perspective view of the outer cover showing an end cover in place. In this view, the outer cover tube 18 is shown. At each end of the outer cover tube 18, an end cover 19 is attached. The end covers are of a similar material as the outer cover tube 18. The ends form a tight seal with the outer cover tube 18 to prevent moisture and other contaminants from entering the outer cover tube 18. At the center of each end is a hole 20, which allows the bolts or other threaded fasteners to enter the end cover 19 to be secured in the end nuts 17b of the steel core 17. FIG. 9 is a top view of an end cover showing end cover 19 and the hole 20.

The use of an inner steel core and a resilient outer cover that is made to survive in harsh climate conditions ensures that this damper will last for a long time in the field.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

We claim:

1. A weather resistant pipeline vibration dampener comprising:
   a) an inner steel core having a first end and a second end threaded to receive a pair of fasteners;
   b) an outer cover positioned over said inner steel core and having a first end and a second end, each with a hole therein to receive one of said pair of fasteners; and
   c) a pair of links, one of said pair of links attached to said first end of said outer cover and the other of said pair of links attached to the second end of said outer cover, each of said pair of links secured thereon by one of said pair of fasteners.

2. A weather resistant pipeline vibration dampener having a plurality of dampening members, each of said plurality of dampening members having a first end and a second end, comprising:
   a) an inner steel core including:
      i) a length of wire rope having two ends; and
      ii) means for accepting a pair of threaded fasteners, fixedly attached to each of said two ends of said length of wire rope;
   b) an outer cover positioned over said inner steel core and having a first end and a second end, each with a hole therein to receive one of said pair of fasteners; and
   c) a plurality of links, each of said plurality of links having a first hole and a second hole formed therein, and wherein one of said plurality of links is attached to the first end of each of said plurality of dampening members, and another of said plurality of links is attached to the second end of each of said plurality of dampening members.

3. The weather resistant pipeline vibration dampener of claim 2 whereby:
   a first of said plurality of dampening members has a top terminal link attached to one end of said outer cover of said first dampening member, said top terminal link extending upwardly therefrom; and
   a last dampening member has a bottom terminal link attached to one end of said outer cover of said last dampening member, said bottom terminal link extending downwardly therefrom.

4. The weather resistant pipeline vibration dampener of claim 1 wherein the outer cover is made of a weather resistant material.

5. The weather resistant pipeline vibration dampener of claim 2 wherein the outer cover of each of said plurality of links is made of a weather resistant material.

6. The weather resistant pipeline vibration dampener of claim 1 wherein the outer cover is made of a class A multipurpose tubing of arctic grade rubber, having a temperature range of between about −65 to +180 degrees Fahrenheit.

7. The weather resistant pipeline vibration dampener of claim 2 wherein the outer cover of each of said plurality of dampening members is made of a class A multipurpose tubing of arctic grade rubber, having a temperature range of between about −65 to +180 degrees Fahrenheit.

8. The weather resistant pipeline vibration dampener of claim 1 wherein the inner steel core is made of a 1" steel wire cable having a 6×25 independent wire rope core (IWRC).

9. The weather resistant pipeline vibration dampener of claim 8 wherein the inner steel core has a minimum breaking strength of 83,600 lbs. and a safe load of 16,700 lbs.

10. The weather resistant pipeline vibration dampener of claim 2 wherein the inner steel core of each of said plurality of dampening members is made of a 1" steel wire cable having a 6×25 independent wire rope core (IWRC).

11. The weather resistant pipeline vibration dampener of claim 10 wherein the inner steel core of each of said plurality of dampening members has a minimum breaking strength of 83,600 lbs. and a safe load of 16,700 lbs.

12. The weather resistant pipeline vibration dampener of claim 1 wherein said first end and said second end of said inner steel core further include a first threaded nut fixedly attached to said first end of said inner steel core, and a second threaded nut fixedly attached to said second end of said inner steel core.

13. The weather resistant pipeline vibration dampener of claim 2 wherein the said first end and said second end of said inner steel core further include a first threaded nut fixedly attached to said first end of said inner steel core, and a second threaded nut fixedly attached to said second end of said inner steel core.

14. The weather resistant pipeline vibration dampener of claim 12 wherein the first and second threaded nuts attached to said first and second ends of said inner steel core are welded to said inner steel core.

15. The weather resistant pipeline vibration dampener of claim 13 wherein the first and second nuts attached to said first and second ends of said inner steel core of each of said plurality of dampening members are welded to said inner steel core of each of said plurality of dampening members.

16. The weather resistant pipeline vibration dampener of claim 1 wherein the each of the fasteners comprises a bolt.

17. The weather resistant pipeline vibration dampener of claim 2 wherein the each of the fasteners comprises a bolt.

\* \* \* \* \*